(12) United States Patent
Meindl

(10) Patent No.: US 9,070,001 B2
(45) Date of Patent: Jun. 30, 2015

(54) SAFE INITIALIZATION PROCEDURE FOR A COMMUNICATION SYSTEM

(75) Inventor: Reinhard Meindl, Graz (AT)

(73) Assignee: NXP B.V., Eindhoven (NL)

( * ) Notice: Subject to any disclaimer, the term of this patent is extended or adjusted under 35 U.S.C. 154(b) by 1136 days.

(21) Appl. No.: 13/120,023

(22) PCT Filed: Sep. 18, 2009

(86) PCT No.: PCT/IB2009/054092
§ 371 (c)(1),
(2), (4) Date: Mar. 21, 2011

(87) PCT Pub. No.: WO2010/032211
PCT Pub. Date: Mar. 25, 2010

(65) Prior Publication Data
US 2011/0291808 A1    Dec. 1, 2011

(30) Foreign Application Priority Data
Sep. 19, 2008   (EP) ..................................... 08105389

(51) Int. Cl.
| | |
|---|---|
| *G06K 7/01* | (2006.01) |
| *G06K 7/00* | (2006.01) |
| *G06F 21/60* | (2013.01) |
| *G06Q 20/40* | (2012.01) |
| *G06F 21/73* | (2013.01) |
| *G06K 19/07* | (2006.01) |

(52) U.S. Cl.
CPC ............ *G06K 7/0008* (2013.01); *G06F 21/606* (2013.01); *G06Q 20/40975* (2013.01); *G06F 21/73* (2013.01); *G06K 19/0723* (2013.01)

(58) Field of Classification Search
CPC ... G06K 7/0008; G06K 7/01; G06K 19/0723; G06F 21/606; G06F 21/62; G06F 21/73; G06Q 20/40975
USPC .................. 340/10.1, 10.3, 10.34, 572.1, 10.2
See application file for complete search history.

(56) References Cited

U.S. PATENT DOCUMENTS

| | | | | |
|---|---|---|---|---|
| 4,779,090 | A * | 10/1988 | Micznik et al. ............... | 340/5.26 |
| 5,757,923 | A * | 5/1998 | Koopman, Jr. .................. | 380/46 |
| 5,798,711 | A * | 8/1998 | Issa et al. ...................... | 340/5.26 |
| 7,587,050 | B2 | 9/2009 | Wenzel et al. | |
| 8,621,602 | B2 | 12/2013 | Rijnswou Van et al. | |
| 2005/0134459 | A1* | 6/2005 | Glick et al. ................. | 340/572.1 |
| 2006/0080732 | A1* | 4/2006 | Ohkubo et al. ................... | 726/9 |
| 2006/0208859 | A1* | 9/2006 | Hougen et al. ............... | 340/10.1 |

FOREIGN PATENT DOCUMENTS

WO      2005/101289 A     10/2005

* cited by examiner

*Primary Examiner* — Jennifer Mehmood
*Assistant Examiner* — Yong Hang Jiang

(57) ABSTRACT

A transponder (140) for communicating with a reader device (120), the transponder (140) comprising a processing unit (142) adapted for generating an identifier (210) during an initialization phase of a communication session with the reader device (120), the identifier (210) being generated as a combination of a first part (214) being a random number and of a second part (212) being identical to a portion (202) of a previous identifier (200) used during a previous communication session preceding the present communication session with the reader device (120), and a transmission unit (136) adapted for transmitting the identifier (210) to the reader device (120).

11 Claims, 2 Drawing Sheets

SAFE INITIALIZATION PROCEDURE FOR A COMMUNICATION SYSTEM

FIELD OF THE INVENTION

The invention relates to a transponder for communicating with a reader device.

Furthermore, the invention relates to a reader device for communicating with a transponder.

Moreover, the invention relates to a method of operating a reader device.

Furthermore, the invention relates to a method of operating a transponder.

Beyond this, the invention relates to a program element.

Furthermore, the invention relates to a computer-readable medium.

BACKGROUND OF THE INVENTION

The importance of automatic identification systems increases particularly in the service sector, in the field of logistics, in the field of commerce and in the field of industrial production. Further applications of identification systems are related to the identification of persons and animals.

In particular contactless identification systems like transponder systems (for instance using an RFID tag) are suitable for a wireless transmission of data in a fast manner and without cable connections that may be disturbing. Such systems use the emission and reflection/absorption of electromagnetic waves, particularly in the high frequency domain. For a normal contactless smart card transaction the terminal starts to send a message to request all present cards to provide a response. During the initialization phase all cards provide an identification code that allows the terminal to distinguish the cards and address them individually.

Pseudo random identifiers are known from ISO/IEC 14443 Type B.

Fixed and unique as well as random identifiers are known from ISO/IEC 14443 Type A.

Since all the commands and responses during the initialization phase may be sent in plain text, (unencrypted) fixed and unique identifiers impose a certain risk to be misused for unauthorized tracking purposes, something that is frequently called privacy problem.

Random identifiers resolve any privacy issue and are therefore mandated by many applications because they are generated randomly after each power-up of after each reception of a REQUEST command.

Hence, conventional transponder-based communication systems may be not safe enough to ensure privacy. Moreover, a reliable performance of such systems may not be guaranteed under undesired circumstances such as a sudden interruption of a communication connection between a transponder and a reader device.

OBJECT AND SUMMARY OF THE INVENTION

It is an object of the invention to provide a communication system which provides reliability of operation and which provides safety.

In order to achieve the object defined above, a transponder for communicating with a reader device, a reader device for communicating with a transponder, a method of operating a transponder, a method of operating a reader device, a program element and a computer-readable medium according to the independent claims are provided.

According to an exemplary embodiment of the invention, a transponder for communicating with a reader device is provided, the transponder comprising a processing unit (which may also be denoted as a transponder processing unit) adapted for generating an identifier (such as an identifier for identifying the transponder in a communication system and particularly for distinguishing the transponder from other transponders in the communication system) during an initialization phase of a communication session with the reader device, the identifier being generated as a combination of a first part (or a first section) being a random number (which may be newly generated by the transponder or which may be retrieved by the processing unit as previously stored in a memory of the transponder) and of a second part (or a second section) being identical to a portion of a previous identifier (for instance identical to a sub-portion of or identical to an entire previous identifier) used during a previous communication session preceding (particularly in time) the present communication session with the reader device, and a transmission unit (such as an antenna) adapted for transmitting the identifier to the reader device (for instance in form of a communication message sent from the transponder to the reader device).

According to another exemplary embodiment of the invention, a reader device for communicating with a transponder is provided, the reader device comprising a receiving unit (such as an antenna) adapted for receiving, from the transponder, an identifier during an initialization phase of a communication session with the transponder, and a processing unit (which may also be denoted as a reader processing unit) adapted for identifying the identifier as a combination of a first part (or a first section) being a random number generated by the transponder and of a second part (or a second section) being identical to a portion of a previous identifier (for instance identical to a sub-portion of or identical to an entire previous identifier) used during a previous communication session preceding the present communication session with the transponder.

In an embodiment, a transponder having the above mentioned features and a reader device having the above mentioned features may form a communication system.

According to still another exemplary embodiment of the invention, a method of operating a transponder for communicating with a reader device is provided, the method comprising generating an identifier during an initialization phase of a communication session with the reader device, the identifier being generated as a combination of a first part being a random number and of a second part being identical to a portion of a previous identifier used during a previous communication session preceding the present communication session with the reader device, and transmitting the identifier to the reader device.

According to still another exemplary embodiment of the invention, a method of operating a reader device for communicating with a transponder is provided, the method comprising receiving, from the transponder, an identifier during an initialization phase of a communication session with the transponder, and identifying the identifier as a combination of a first part being a random number generated by the transponder and of a second part being identical to a portion of a previous identifier used during a previous communication session preceding the present communication session with the transponder.

According to still another exemplary embodiment of the invention, a program element (for instance a software routine, in source code or in executable code) is provided, which, when being executed by a processor, is adapted to control or carry out one or both of the methods having the above mentioned features.

According to yet another exemplary embodiment of the invention, a computer-readable medium (for instance a semiconductor memory, a CD, a DVD, a USB stick, a floppy disk or a harddisk) is provided, in which a computer program is stored which, when being executed by a processor, is adapted to control or carry out one or both of the methods having the above mentioned features.

Data processing which may be performed according to embodiments of the invention can be realized by a computer program that is by software, or by using one or more special electronic optimization circuits, that is in hardware, or in hybrid form, that is by means of software components and hardware components.

The term "reader device" may denote a base station adapted for sending an electromagnetic radiation beam for reading out a transponder and detecting a back reflected signal. Such a reader device may be an RFID reader, for instance.

The term "transponder" may particularly denote an RFID tag or a (for instance contactless) smartcard. More generally, a transponder may be a device (for instance comprising a chip) which may automatically transmit certain (for example encoded) data when activated by a special signal from an interrogator.

The term "application" may particularly denote a service within a communication system formed by the reader and the transponder to which service the transponder may provide a contribution. The provision of such a contribution may involve the capability of the transponder to provide stored or calculated data, to provide processing capabilities, etc. Examples for such services are the payment of a fare for using a public transportation by a user of the transponder, the payment of a purchase price for a good by a wireless payment system, etc.

The term "communication session" may particularly denote a continuous time interval during which a transponder is communicatively coupled with a reader device, particularly an uninterrupted time interval during which the transponder is within a communication range of the reader device. When the transponder leaves this communication range or, more generally, when the communication between the transponder and the reader is interrupted, the respective communication session is terminated. Hence, the beginning of a communication session may be a point of time at which the transponder enters a communication range of the reader device, is powered up, or receives an initial request from the reader device. Accordingly, the end of a communication session may be a point of time at which the transponder leaves the communication range of the reader device, is no longer powered, or has completed a communication with the reader device.

According to an exemplary embodiment of the invention, a safely operable transponder/reader communication system may be provided in which an identifier (such as an identification number) for unambiguously identifying the transponder and being used during a communication of the transponder and the reader for identification purposes is newly formed by the transponder for each communication session. In this context, an updated random identifier is formed to comprise a random part and an auxiliary part which is copied from the previous session and is hence known by both communication partners of the previous session. In an undesired scenario in which a communication session between a transponder and a reader is interrupted (for instance because the user of the transponder suddenly leaves a communication range of the reader or the like), the described identifier generation architecture may safely prevent that the reader and the transponder, when being communicatively coupled later again, repeat an already performed action (for instance the execution of an application) for a second time in an undesired manner. The latter may be prevented by an embodiment of the invention, since the reader may keep stored the last identifier used during the previous communication session so that the reader can easily compare portions of this identifier with a new identifier transmitted from a transponder during an initialization or identification phase of the subsequent communication session. For instance, in the scenario of a transponder-based fair debiting system, it may be safely prevented that a fair for public transportation is deducted from a credit stored in the transponder for a second time only because the communication between the reader and the transponder has been interrupted during deducting this fair in a previous communication session. Thus, it can be prevented that the user has to pay the fair twice although using the public means of transport only once. The inventive system therefore combines advantages of a random identifier (particularly a high degree of safety and a proper protection against attacks) with a high reliability of preventing undesired double execution of applications.

In an embodiment, a split random identifier (ID) may be used to allow reidentification of already processed cards. Such an embodiment may be applied to RFID systems and in particular to an improvement of the initialization of a communication process between a read/write station and a card.

During an initialization process, a card may generate a random identifier which, after transmitting it to the read/write station, allows the unique addressing of the card during the consecutive communication between the station and the card. Random identifiers may be used in order to prevent privacy issues.

A traditional random identifier based initialization process shows a significant problem in processing a transaction between a station and the card, which transaction is terminated or interrupted unintentionally/accidentally, for instance by uncontrolled behavior of a user. In this situation the transaction process might be re-triggered by re-entering the card into the communication field of the station and restarting the initialization, which in fact ends up with a new random identifier being communicated to the station. In fact the card may be identified as a new card and recovering the faulty or corrupted data in the card or even identifying unintentional double booking may require a lengthy process of data analysis. In particular the risk of double booking is unavoidable in such conventional system because the card is identified as a new card.

In order to overcome the problem addressed above, an embodiment of the invention teaches on the card side to randomly generate only one part of the identifier and to keep another part of the identifier identical with the content generated during the previous initialization process. On the station side storing the identifiers for at least two consecutive initialization processed may be advantageous. If one of the two fields is identical during consecutive initializations the card may be identified on the station side as the card being processed before. Such an embodiment may provide for easy detection of already processed card by checking the unchanged part of the identifier. Consequently, unintended double transactions may be avoidable while at the same time the concept of random identifiers serving privacy demands may be maintained.

In the following, further exemplary embodiments of the transponder will be explained. However, these embodiments also apply to the reader device, to the methods, to the program element and to the computer-readable medium.

The processing unit of the transponder (which may be an electronic chip, for instance an integrated circuit) may be adapted for generating the identifier with an order (for instance a succession or sequence) of the first part and the second part which order is modified between subsequent communication sessions. For example, for each communication session, it may be determined (for instance on a random basis or on the basis of a predetermined rule, for instance using an algorithm or a formula or the like) whether the random part which is newly generated for a specific communication session precedes or succeeds the portion of the identifier taken from the previous communication session. Thus, for a potential attacker, it may be difficult to determine which portion of an identifier is a newly generated random number and which part of the identifier is identical to a previous session for recognition purposes. For example, a rule used for deriving which portion of the identifier shall remain the same as in the previous session should be known by both the transponder and the reader device.

In a preferred embodiment, the processing unit of the transponder may be adapted for generating the identifier with an order (or a succession or a sequence) of the first part and the second part which order is alternated between subsequent communication sessions. For instance, during communication sessions having an "even" session number (that is a second, fourth, sixth, etc., session), the newly generated random part may precede the copied part. In contrast to this, during "odd" communication sessions, the newly generated random part may succeed the copied part. This scheme of alternating the order is a numerically simple rule allowing for a fast communication and low computational burden and at the same time preventing an attacker from obtaining information how the identifier is constituted. Hence, in an embodiment, the different fields of the identifier may be alternated for security reasons when updating the identifier.

The processing unit may be adapted for generating the identifier with at least one further part, wherein only one or two of the first part and the second part and the at least one further part is changed between subsequent communication sessions. At least one of the first part and the second part and the at least one further part may maintain the same between subsequent communication sessions. Thus, in addition to a first part which is random-based and a second part which is copied from a previous session, at least one third part may be included in the identifier which third part may make it even more difficult for an attacker to identify the communication pattern between transponder and reader. For instance, the third part may be a part, which is constant for all communication sessions. In another embodiment, the further part may be a further random number. In still a further embodiment, the at least one further part may include another portion copied from a previously used identifier. Combinations of the mentioned alternatives are possible.

The processing unit may be adapted for, upon receipt of a communication command from the reader device addressed to the transponder by means of the identifier (serving as an address), executing an application. For example, after an identification or initialization phase, the reader and the identifier have agreed upon an identifier used for a subsequent communication between these two entities. For subsequent messages, the reader may include the identifier in the message to enable the transponder to understand whether the present transponder is the intended receiver or addressee of the present communication message. With such a communication message, the reader device may instruct the transponder to perform a specific application, for instance to debit an amount of money from an account managed in the transponder. In order to ensure that such an application is properly performed, a portion of the previously used identifier may be repeated so that the reader device can identify the transponder as the one which was used for previous communication.

In the following, further exemplary embodiments of the reader device will be explained. However, these embodiments also apply to the transponder, to the methods, to the program element and to the computer-readable medium.

The reader device may have a processing unit (such as a microprocessor or a central processing unit, CPU) which may be adapted for identifying that the transponder of the present communication session is identical to the transponder of the previous communication session upon determining that the second part of the identifier is identical to the portion of the previous identifier. By performing such a check, the reader device may rule out that, when an agreed identifier generation scheme is used, the transponder is assumed to be a different transponder as compared to a transponder with which the reader device has communicated during a previous communication session. This guarantees the reliability of the communication system.

The processing unit may be adapted for, upon identifying that the transponder of the present communication session is identical to the transponder of the previous session, taking measures for preventing a repeated execution of an application which has already been executed for the transponder during the previous communication session. This can be advantageous in case that the previous communication session has already completed the execution of an application and the system can be prevented from executing the same application again. Only upon determining that, during the previous communication session which has been interrupted unintentionally, the application has not been executed completely, the system may make efforts for completing this application or for repeating the execution of this application again.

The reader device may further comprise a storage unit (or a memory unit) adapted for storing data indicative of both the identifier of the transponder of the present communication session and the identifier of a transponder of the previous communication session. Such a storage unit may be a semiconductor memory such as an EEPROM. The processing unit of the reader device may have access to this memory device for storing data during the communication phase, and for retrieving data. For instance, it may be possible that the storage unit stores both identifiers from the present and the last communication session because this information is useful for performing the verification task of the inventive system.

The processing unit may further be adapted for evaluating the identifier with an order of the first part and the second part (first part preceding the second part, or vice versa) which order is modified between subsequent communication sessions. By modifying, particularly alternating, the order of the first part and the second part in different communication sessions, it may be made even more difficult for an attacker to analyze the scheme of the invention.

It is also possible that the communication between the transponder and the reader device is decrypted, that is to say that the exchanged identifier is decrypted with an agreed key word before transmission. This may further increase the safety of the operation and may make it difficult for an attacker to attack the system. Alternatively, a part of the communication or the entire communication between transponder and reader may be without encryption, for instance in plaintext.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DETAILED DESCRIPTION OF EMBODIMENTS

Figure 1:
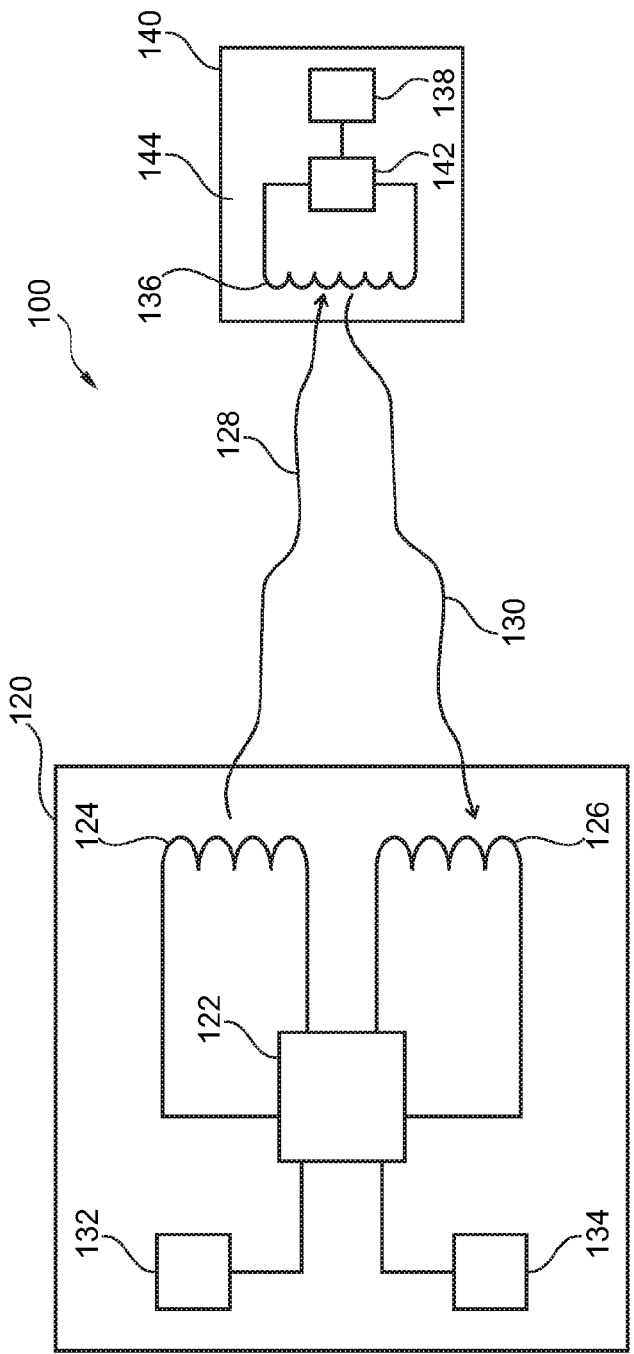
FIG. 1 illustrates a communication system according to an exemplary embodiment of the invention.

The illustration in the drawing is schematically. In different drawings, similar or identical elements are provided with the same reference signs.

Conventionally, random identifiers (ID) generate a difficulty for terminals that want to prevent double booking of transactions, which is explained in the following. If a user initiates a payment or ticketing transaction then a card is requested and normally processed. However, for instance due to an uncontrolled behavior of the user, the card may disappear from the field and may enter again later. A card with fixed IDs can easily be recognized as already processed when the terminal remembers and compares with the fixed IDs of the last processed cards whereas a card with random IDs appears to be a new card during initialization. The terminal then proceeds with a new transaction, has to run through the whole authentication procedure until eventually the fact that the transaction has taken place already one second ago, is detected. This lengthily process may cause dissatisfaction of the user and shall be avoided.

Embodiments of the invention intend that unintended double transaction shall be detected as soon as possible to allow the user to finish the transaction as soon as possible.

According to an embodiment, a method is provided that allows easy detection of potential double booking whereas providing randomly changing IDs shall improve or ensure privacy issues. Such a method may split the random ID in two or more fields, and for each new generated ID only one field is updated with a new random code. In an example, the identifier may be split into two fields. The card IC may update the two fields alternately with a random code whenever a new random ID shall be produced. The terminal can detect the last processed card with a high probability by comparing the two fields with the contents of the previously processed card. If one of the two fields is identical then the card may be recognized as the same card as it was used in the previous transaction.

However, the ID may also be split into more than two fields, generally n fields. This allows the terminal to recognize cards from the last (n−1) transactions. However, for practical reasons, a certain minimum field length should be kept in order to provide the necessary randomness. The method allows recognition of the last processed card even when the card identifiers change randomly.

Such a method is compliant to existing standards because no change needs to be applied for the interface between card and terminal. The specific additional requirements can be implemented inside the card functionality in order to generate only part of the ID with a new code and also inside the terminal functionality to compare individual fields of continuously receiving IDs.

In the following, referring to FIG. 1, a corresponding communication system 100 according to an exemplary embodiment of the invention will be explained.

The communication system 100 comprises a reader 120 and a transponder 140.

The reader 120 comprises a processor 122 (such as a microprocessor or a central processing unit), which is communicatively coupled with an emitter antenna 124, and a receiver antenna 126. The emitter antenna 124 is capable of transmitting a communication message 128 to the transponder 140. The receiver antenna 126 is capable of receiving a communication message 130 from the transponder 140. Although the transmission antenna 124 and the receiver antenna 126 are illustrated as two different antennas in FIG. 1, alternative embodiments may also use a single common shared transceiver antenna.

The antennas 124, 126 are electrically coupled with the processor 122 so that data may be sent from the processor 122 to the transmission antenna 124 for transmission as a communication message 128. A communication message 130 received by the receiver antenna 126 may also be analyzed and processed by the processor 122.

A storage unit 132 such as a semiconductor memory is coupled with the processor 122 so as to allow storing data accessible for the processor 122. Furthermore, an input/output unit 134 is shown which allows a user to operate the reader device 120. The input/output unit 134 may comprise input elements such as buttons, a keypad, a joystick or the like. Via such input elements, a user may input commands to the reader device 120. Furthermore, the input/output unit 134 may comprise a display unit such as a liquid crystal display allow displaying results of the reading procedure of the reader device 120 visible for a user.

As can be further taken from FIG. 1, the transponder 140 comprises a transmission and receiver antenna 136, a processor 142 such as a microprocessor and a memory 138. In an embodiment, the memory 138 and the processor 142 may be monolithically integrated in an integrated circuit (IC) which can be connected to the antenna 136 and attached to a support 144 such as a piece of fabric.

The communication messages 128, 130 can be exchanged in a wireless manner between the entities 120, 140.

Figure 3:
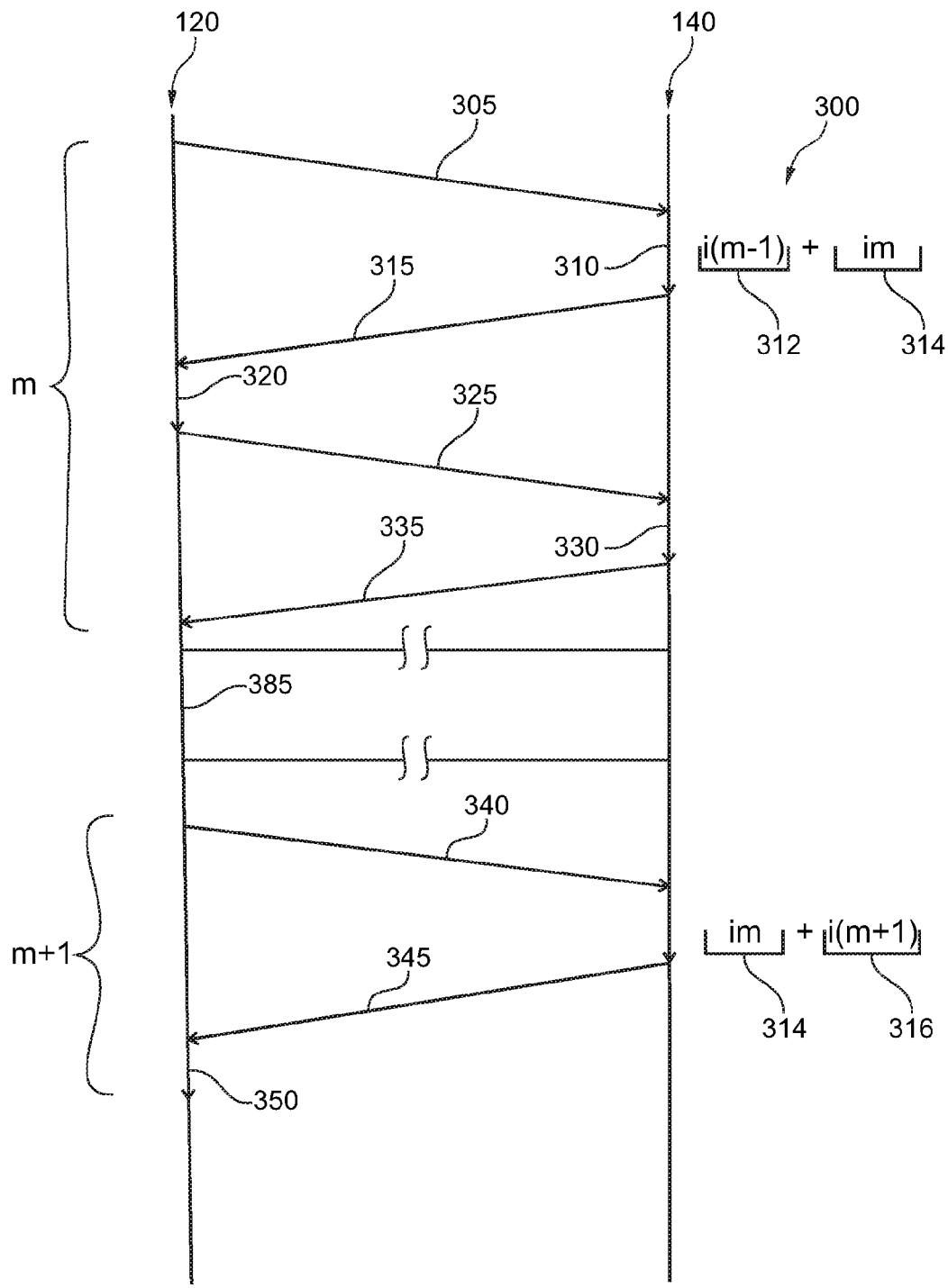
FIG. 3 illustrates a flowchart showing a communication according to an exemplary embodiment of the invention.

As can be taken from FIG. 1, the communication messages 128 and 130 can be exchanged between the reader 120 and the transponder 140. Referring to FIG. 3, a detailed communication procedure according to which the reader 120 and the transponder 140 communicate will be explained. In the context of this communication protocol, the processor 122 of the reader 120 may perform processing tasks and may store data in the memory 132. It is also possible that the processor 122 retrieves data stored in the memory 132. Via the transmission coil 124, wireless communication messages 128 may be transmitted to the transponder 140. The transponder 140, which may be an active transponder or a passive transponder (that is a transponder having an own power supply such as a battery or a transponder being powered by power of the electromagnetic radiation carrying the communication message 128) may then, in turn, generate a communication message 130 to be transmitted by the transmission coil 136 to the receiver coil 126.

Figure 2:
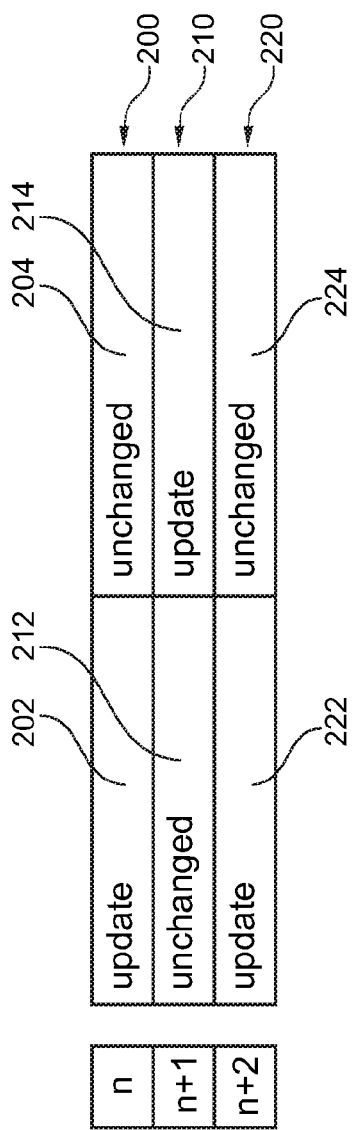
FIG. 2 illustrates a scheme of generating an identifier in a transponder in different communication sessions according to an exemplary embodiment of the invention.

FIG. 2 shows a table indicating a scheme according to which identifiers may be generated by the transponder 140 during subsequent communication sessions n, n+1, n+2 between the transponder 140 and the reader 120.

FIG. 2 shows how an identifier 200 is constituted during an n-th communication session (see first row). During this n-th communication session, a beginning portion of the identifier 200 is updated or newly generated (compare section 202), whereas a termination section 204 remains unchanged (as compared to a previous or initial sequence of numbers and/or letters). In other words, the unchanged portion 204 is maintained constant and may be simply copied from a previous communication session (not shown in FIG. 2).

In an (n+1)-th communication session, a new identifier 210 is generated for communication between the reader 120 and the transponder 140. In this identifier 210, the portion 202 that has been updated in the previous n-th communication session is maintained constant. In other words, section 212 is identical to section 202. However, a section 214 of the identifier 210 is newly generated as a new random number. Thus, the corresponding portion 204 that has remained unchanged in the previous n-th communication session is now changed in the (n+1)-th communication session. This alternating scheme is continued in a subsequent (n+2)-th communication session during which a third identifier 220 is generated in which the second portion 214 remains unchanged and is now denoted with reference numeral 224, whereas the previously unchanged section 212 is now updated so that an updated section 222 is generated.

FIG. 3 shows a communication scheme 300 according to an exemplary embodiment of the invention.

Such a communication scheme 300 can be realized by the communication system 100 shown in FIG. 1. Hence, the communication scheme 300 shows a communication between the reader 120 and the transponder 140.

FIG. 3 starts with an m-th communication session at the beginning of which an initialization phase is carried out. In this context, the reader 120 sends an identification interrogation message 305 to all transponders within a communication range of the reader 120—hence also to the transponder 140. With this identification interrogation message 305, the reader 120 asks all transponders to respond with their respective identifiers so that for a subsequent communication, the reader device 120 may address a dedicated one of the transponders 140 based on the identifier.

Upon receipt of the identification interrogation request 305, the transponder 140 generates an identifier during an identifier generation phase 310. As can be taken from FIG. 3, the generated transponder comprises a portion 312 which is taken or copied from the previous communication session, namely the (m−1)-th communication session. The identifier generated during the identifier generation phase 310 further comprises an additional section 314 which is newly generated during the m-th communication session. Reference numeral 314 denotes a random number generated by the processor 142 of the transponder 140.

After the generation of the identifier during the identifier generation phase 310, the transponder 140 sends an identification message 315 to the reader 120. This identification message 315 (an encrypted message or a plaintext message) includes the generated ID, that is the combination of sections 312 and 314, so that for subsequent communication between the reader 120 and the transponder 140, this identifier will be used.

In a processing phase 320, the reader 120 evaluates the identification message 315 and, inter alia, stores the included data in the memory 132. When the identification of the transponder 140 by the reader 120 is finished, the reader 120 may send an application interrogation message 325 to the transponder 140. The application interrogation message 325 may include the identifier 312, 314 of the transponder 140 to indicate to the transponder 140 that this specific transponder 140 is the intended addressee of the communication message 325. For example, the application interrogation message 325 may include the instruction that the processor 142 of the transponder has to deduct a fare for a public transportation which is used by a human user carrying the transponder 140 in her or his pocket. In the memory 138 of the transponder, a remaining credit for using the public transportation is stored so that, upon receipt of the application interrogation message 325, the transponder 140 first analyzed whether it is the intended addressee of the communication message 325 (by comparing the identifier included in the communication message 325 with the previously generated identifier stored in the memory 138). After successful confirmation that this transponder 140 is intended as an addressee of the communication message, a processing capability of the processor 142 is used to calculate a new credit value and to store the reduced credit value in the memory 138. This is performed during a calculation phase 330.

After having deducted the prize for using the public transportation, a confirmation message 335 may be sent from the transponder 140 to the reader 120.

Under undesired circumstances, it may happen that the communication channel or path between the reader 120 and the transponder 140 is interrupted, for example during a time interval denoted with reference numeral 385. During this time interval 385, no communication between the reader 120 and the transponder 140 is possible, for instance since the distance between the reader 120 and the transponder 140 is temporarily to large.

However, it can happen that the transponder 140 comes back into the communication range of the reader 120 again which starts an (m+1)-th communication session. Again, during this communication session, the reader 120 may send another identification interrogation message 340 to the transponder 140 (compare identification interrogation message 305). Upon receipt of the identification interrogation message 340, the transponder 140 will generate a new identifier which is constituted of the terminating part 314 of the previous identifier and a newly generated random part 316.

The transponder 140 may then send back, by a transponder identification message 345 the identifier 314, 316 for the (m+1)-th session. The reader 120 will receive this identifier and will recognize identity of the portions 314 of the identifiers transmitted during the m-th communication session and the (m+1)-th communication session.

Based on this evaluation, the reader 120 may recognize that the transponder 140 communicatively coupled during the (m+1)-th communication session is the same as the one communicatively coupled during the m-th communication session so that the reader 120 will not trigger execution of the application since this application has already been finished in the previous communication phase (compare reference numerals 325, 330, 335).

The generated random number may be a pseudo random number. In contrast to a pseudo random number, a truly random number is a number produced independently of its generating criteria. For cryptographic purposes, numbers based on physical measurements may be considered as random. Pseudo random numbers may be numbers with as little detectable pattern as possible but not truly random. Computer programs may make pseudo random numbers because they cannot make truly random numbers. The random number generator may be part of the transponder.

One skilled in the art should note, that the inventive transponder, the inventive reader and the inventive methods, as well as the inventive software is not limited to contactless data transmission, but in principle also applies to wired communication.

Any one of the random number, the identifier, and an optional key for encryption/decryption may be any sequence of numeric characters, sequence of letters, or any alphanumeric code.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A transponder for communicating with a reader device, the transponder comprising:
    a processing unit adapted for generating an identifier during an initialization phase of a communication session with the reader device, the identifier comprising a first part, which is a random number, and a second part, which is identical to at least a portion of a previous identifier used during a previous communication session preceding the present communication session with the reader device, wherein the at least a portion of the previous identifier used during a previous communication session preceding the present communication session is a random number generated for the previous communication session;
    a transmission unit adapted for transmitting the identifier to the reader device;
    wherein the processing unit is adapted for generating the identifier with an order of the first part and the second part which order is modified, particularly is alternated, between subsequent communication sessions.

2. The transponder according to claim 1, wherein the processing unit is adapted for generating the identifier to comprise at least a third part, wherein one, particularly only one, of the first part and the second part and the at least one third part is changed between subsequent communication sessions.

3. The transponder according to claim 1, wherein the processing unit is adapted for, upon receipt of a communication command from the reader device addressed to the transponder by means of the identifier, executing an application in accordance with the communication command.

4. The transponder according to claim 1, wherein the transponder comprises one of the group consisting of a radio frequency identification tag and a contactless chip card.

5. A reader device for communicating with a transponder, the reader device comprising:
    a receiving unit adapted for receiving, from the transponder, an identifier during an initialization phase of a communication session with the transponder;
    a processing unit adapted for identifying the identifier as comprising two parts, a first part, which is a random number generated by the transponder, and a second part, which is identical to at least a portion of a previous identifier used during a previous communication session preceding the present communication session with the transponder, wherein the at least a portion of the previous identifier used during a previous communication session preceding the present communication session is a random number generated for the previous communication session;
    wherein the processing unit is adapted for evaluating the identifier with an order of the first part and the second part which order is modified, particularly is alternated, between subsequent communication sessions.

6. The reader device according to claim 5, wherein the processing unit is adapted for identifying that the transponder of the present communication session is identical to the transponder of the previous communication session upon determining that the second part of the identifier is identical to the portion of the previous identifier.

7. The reader device according to claim 6, wherein the processing unit is adapted for, upon identifying that the transponder of the present communication session is identical to the transponder of the previous session, preventing a repeated execution of an application which has already been executed for the transponder during the previous communication session.

8. The reader device according to claim 5, comprising a storage unit adapted for storing both the identifier of the transponder of the present communication session and the identifier of a transponder of the previous communication session.

9. A method of operating a transponder for communicating with a reader device, the method comprising:
    generating an identifier during an initialization phase of a communication session with the reader device, the identifier comprising a first part, which is a random number, and a second part, which is identical to at least a portion of a previous identifier used during a previous communication session preceding the present communication session with the reader device, wherein the at least a portion of the previous identifier used during a previous communication session preceding the present communication session is a random number generated for the previous communication session;
    transmitting the identifier to the reader device;
    wherein the identifier is generated with an order of the first part and the second part which order is modified, particularly is alternated, between subsequent communication sessions.

10. A method of operating a reader device for communicating with a transponder, the method comprising:
    receiving, from the transponder, an identifier during an initialization phase of a communication session with the transponder,
    identifying the identifier as comprising two parts, a first part, which is a random number generated by the transponder, and a second part, which is identical to at least a portion of a previous identifier used during a previous communication session preceding the present communication session with the transponder, wherein the at least a portion of the previous identifier used during a previous communication session preceding the present communication session is a random number generated for the previous communication session;
    wherein the identifier is evaluated with an order of the first part and the second part which order is modified, particularly is alternated, between subsequent communication sessions.

11. A non-transitory computer-readable medium, in which a computer program is stored, which computer program, when being executed by a processor, is adapted to carry out or control a method according to claim 9.

* * * * *